Figure 1:
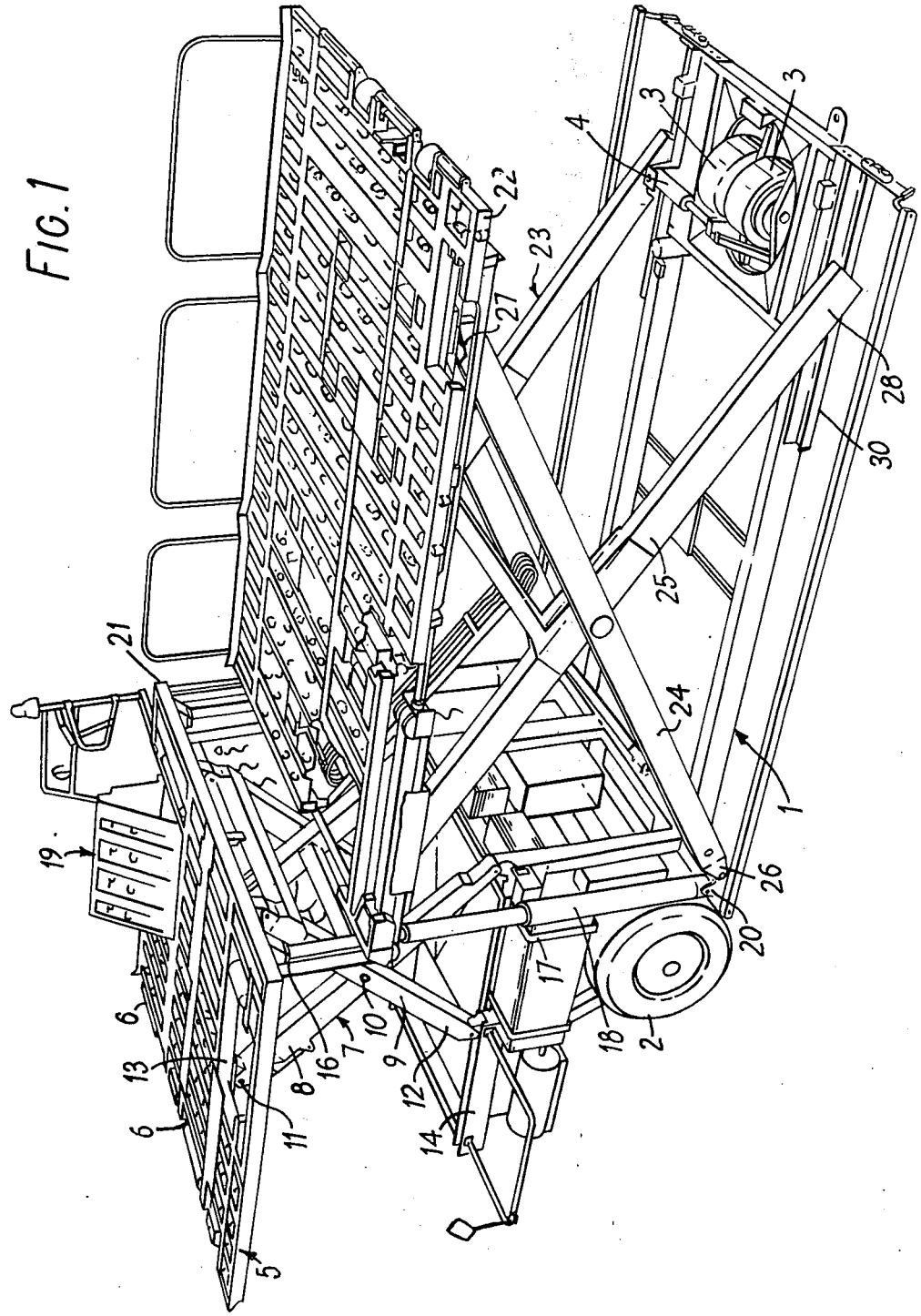

United States Patent [19]
Jones

[11] 3,993,207
[45] Nov. 23, 1976

[54] CARGO LOADING VEHICLES

[75] Inventor: Rodney Vernon Jones, Rochford, England

[73] Assignee: Atel Products Limited, Southend-on-Sea, England

[22] Filed: Mar. 20, 1975

[21] Appl. No.: 560,194

[30] Foreign Application Priority Data
Mar. 22, 1974 United Kingdom............... 12930/74

[52] U.S. Cl. ................................ 214/512; 180/27; 180/144; 180/154; 254/4 C
[51] Int. Cl.² .......................................... B60P 1/02
[58] Field of Search ...................... 214/38 BA, 512; 254/2 R, 2 C, 4 C; 180/11, 65 R, 27, 144, 154

[56] References Cited
UNITED STATES PATENTS

| | | | |
|---|---|---|---|
| 2,399,043 | 4/1946 | Klumb | 254/2 C |
| 3,666,127 | 5/1972 | Guyaux | 214/512 |
| 3,854,610 | 12/1974 | Carder | 214/512 X |

Primary Examiner—Robert G. Sheridan
Attorney, Agent, or Firm—Lon H. Romanski

[57] ABSTRACT

A transporter and cargo loading vehicle for use in transporting cargo for aircraft. The vehicle has a low platform which can accept pallet or container loads at a maximum height from the ground of approximately twenty inches. The vehicle is equipped with front nonsteerable wheels and rear wheels which are steerable.

6 Claims, 2 Drawing Figures

CARGO LOADING VEHICLES

This invention relates to transporter and cargo loading vehicles and is more particularly, although not exclusively concerned with a vehicle which is suitable for use in loading aircraft.

It is to be understood that the term loading has been used herein to refer to vehicles which are used not only for loading but also for unloading.

Such vehicles have to be arranged so that they have a low platform which can accept pallet and container loads at a maximum height above the ground of approximately 20 inches, being the normal standard height for various transporter dollies and the like in the aircrat industry. Where the vehicles are cargo loading vehicles for use in loading aircraft they must also be capable of discharging and accepting loads into and from aircraft at their cargo door sill levels which may vary from 10 to 20 feet above ground level. In such vehicles the platform must be capable of being raised to the required height and to this end it may comprise a single lifting platform adapted to raise the load to the required door sill level or two lifting platforms, namely, a forward lifting platform and a main lifting platform, the forward lifting platform being raised to the height of the door sill level whilst the main lifting platform is that used for raising the loads from ground level up to the door sill height. The platform or platforms may be raised by any suitable means but preferably they are arranged to be raised by scissor lift assemblies and where there are two platforms these are raised independently of one another.

A vehicle according to the present invention comprises a low platform adapted to accept pallet and container loads and having forward non-steerable wheels adjacent to the front of the vehicle and steerable wheels located to the rear thereof.

Preferably the steerable wheels are located adjacent to the rear of the vehicle, and conveniently the steerable wheels are located adjacent to one another in close proximity to the longitudinal centerline of the vehicle.

In one convenient arrangement the steerable wheels are of lesser diameter than the non-steerable wheels.

The platform is preferably adapted to be raised to permit transfer of the load into an aircraft and in one construction it comprises a forward lifting platform and a main lifting platform disposed to the rear thereof. With this arrangement the forward lifting platform is raised to the door sill level of the aircraft and the main lifting platform is then used for raising the loads to the level of the forward lifting platform.

The front and/or rear lifting platforms may be raised by a scissor lift assembly.

Figure 2:
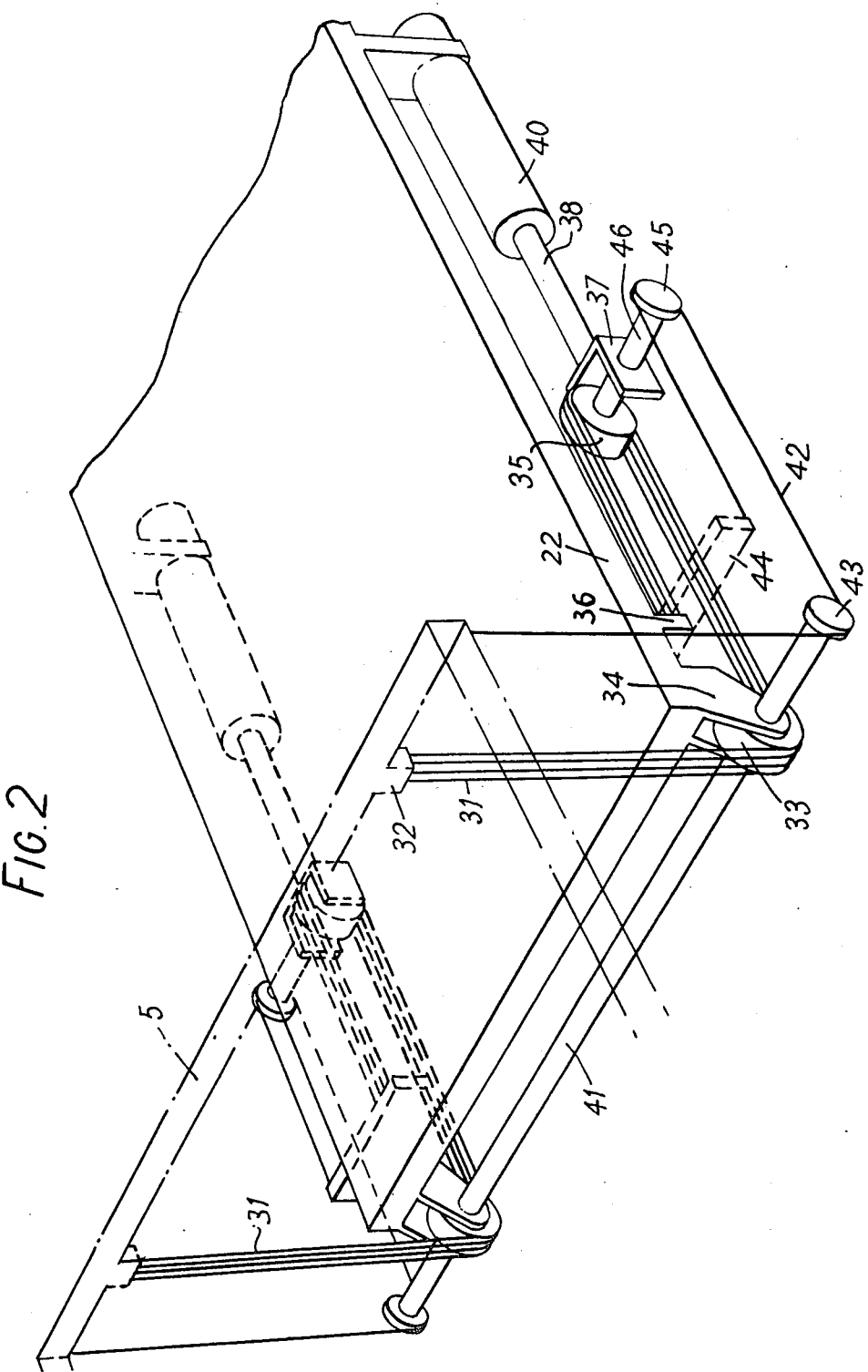

The invention may be performed in various ways and one specific embodiment will now be described by way of example with reference to the accompanying drawings in which:

FIG. 1 is an isometric view of one embodiment of a vehicle according to the present invention which is a cargo loading vehicle comprising two lifting platforms and, FIG. 2 is a detailed view of the lifting apparatus used in this vehicle.

In the arrangement shown in the Figures the vehicle comprises a chassis as indicated generally at 1 upon which are mounted forward support wheels 2 only one of which is visible and rear support wheels 3, the front support wheels 2 being mounted at the outside of the vehicle and being fixed (i.e., non-steerable) whilst the rear wheels 3 are steerable and are actuated by means of hydraulic rams 4 which thus steer the vehicle from the rear. As can be seen from the drawing the rear wheels are mounted adjacent the rear middle of the vehicle.

Mounted above the forward wheels 2 is a front lifting platform indicated generally at 5 having a series of conventional rollers 6 on its upper surface for movement of cargo. A scissor lift indicated at 7 comprises beams 8 and 9 pivoted at 10 and arranged in the conventional fashion to have sliding ends 11 and 12 sliding respectively on runners 13 on the platform and runners 14 rigidly supported on the vehicle above and forwardly of the front wheel 2. The rear end of the arms are respectively pivoted at 16 to the platform and at 17 to the vehicle chassis.

The forward platform 5 is arranged to be lifted by two three stage rams 18 on either side the lower ends of which are coupled at 20 to the main chassis of the vehicle 1 and at 21 to the forward lifting platform.

The vehicle is driven from a front control cabin 19, and can be controlled from outside when in use.

The rear platform comprises a platform 22 beneath which is a scissor assembly indicated at 23 having arms 24 and 25 on each side the arms 24 being pivoted to the chassis at 26 and sliding in runners (not shown) at their upper ends 27 whilst the arms 25 are pivoted at their upper ends to the platform 22 and have their lower ends 28 sliding in runners 30 on the chassis.

As can be more clearly seen from FIG. 2 the lifting mechanism for raising the platform 22 comprises two cables in the form of chains (shown schematically) indicated at 31 attached at their ends 32 to the underside of the rear edge of the forward lifting platform 5 and descend vertically downwards, pass over pulleys 33 mounted on brackets 34, then pass rearwardly over further pulleys 35 and then forwardly again and have their other ends connected at 36 to the underside of the main platform 22. The pulleys 35 are rotationally mounted in bifurcated brackets 37 which are moveable horizontally and are connected to the actuating members 38 of hydraulic rams 40. It will thus be seen that when the actuating members 38 of the rams 40 are moved rearwardly the chains are moved in a 2 to 1 ratio over the pulleys 35 and the platform 22 is hoisted upwardly to the level of the forward platform 5. When this level is reached the platform will automatically be at the correct level, and no adjustment will be required on the part of an operator.

In order to ensure that the cylinders are synchronised the pulleys 33 are secured to a torque shaft 41 to ensure that the chains move evenly. In addition lift stabilising chains 42 pass over further pulleys 43 connected to the torque shaft 41, the chains 42 being anchored at one end to the platform 5 and at the other end to the platform 22 at 44 as indicated and passing over pulleys 45 connected by shafts 46 to the pulleys 35.

Whilst the arrangement has been described with chains wire rope or other suitable cable could be used. Moreover although it is move convenient to raise the main platform by the lifting apparatus it may in some circumstances be more convenient to raise the forward platform.

Although the vehicle described is a vehicle having a forward and main lifting platform the vehicle with which the present invention is concerned may comprise a single lifting platform, or the platform may be static. In the former case the operation of the vehicle is substantially as set forth whilst in the latter case the vehicle is a cargo transporter. In both cases, as well as in the case set forth the platform must be capable of accepting pallet and container loads at the low height required.

Where the vehicle has a single lifting platform or is a transporter vehicle the controls will be set to the side thereof so as to allow free access of cargo onto and off both ends of the platform.

I claim:

1. A cargo vehicle comprising a chassis, said chassis having a forward end and a rearward end, a low platform supported by said chassis, said platform having upper disposed platform surface means effective to accept loads of cargo, first groundengaging wheel means operatively connected to said chassis and effective for imparting driving motion to said chassis with respect to said ground, said first wheel means being situated as to be located generally at the forward end of said chassis and outside of said chassis, said first wheel means having the respective axes of rotation thereof fixed with respect to said chassis and non-steerable, second ground-engaging non-driving wheel means operatively connected to said chassis and effective for steerably controlling the direction of travel of said chassis, said second wheel means being situated as to be located generally at the rearward end and inside of said chassis and beneath said low platform, said second wheel means having an axis of steerable rotation passing generally through the middle of said chassis, said upper disposed platform surface means having an effective operating height when measured from the ground engaged by said wheel means as to be able to laterally accept loads of cargo having a lower surface situated at a distance in the order of approximately 20 inches above said ground, vehicle operator control means for both propelling said chassis by means of said first wheel means and steering said chassis by means of said second wheel means, said operator control means being carried generally at said forward end, and power operated means responsive to said control means for steerably rotating said second wheel means.

2. A cargo vehicle according to claim 1, wherein said steerable second wheel means are of a diamater substantially less than that of the non-steerable said first wheel means.

3. A cargo vehicle according to claim 1, wherein said low platform is adapted to be raised from said operating height to selected higher heights to permit lateral transfer of the load of cargo therefrom and into an aircraft.

4. A cargo vehicle according to claim 3, wherein said low platform comprises a main relatively rearwardly disposed lifting platform, and further comprising a second lifting platform liftable separately from said main platform and disposed generally at said forward end.

5. A cargo vehicle according to claim 4 wherein at least one of said platforms is raised by associated scissor lift assembly means.

6. A cargo vehicle according to claim 1, wherein said first wheel means comprise first and second wheel members each located outside of said chassis and forwardly of said forward end, wherein said second wheel means comprises third and fourth wheel members each partially projecting upwardly through clearance aperture means defined in said chassis, wherein said power means comprises hydraulic cylinder means operatively connected to said third and fourth wheel members and to said chassis, wherein said low platform is operatively connected to said chassis by first and second pairs of spaced scissor legs, said pairs of scissor legs being so spaced as to cause said third and fourth wheel members to be generally between said pairs of scissor legs, said pairs of scissor legs being effective to raise and lower said low platform from and to said effective height, and further comprising a second elevatable platform member carried as to be extending forwardly beyond said forward end of said chassis.

* * * * *